United States Patent
Schneider (10) Patent No.: US 11,403,962 B2
(45) Date of Patent: Aug. 2, 2022

(54) SYSTEM AND METHOD FOR WELD TRAINING

(71) Applicant: Illinois Tool Works Inc., Glenview, IL (US)

(72) Inventor: Joseph C. Schneider, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 291 days.

(21) Appl. No.: 16/528,015

(22) Filed: Jul. 31, 2019

(65) Prior Publication Data

US 2020/0043366 A1 Feb. 6, 2020

Related U.S. Application Data

(60) Provisional application No. 62/714,501, filed on Aug. 3, 2018.

(51) Int. Cl.
G09B 19/24 (2006.01)
G09B 9/00 (2006.01)

(52) U.S. Cl.
CPC .............. *G09B 19/24* (2013.01); *G09B 9/00* (2013.01)

(58) Field of Classification Search
CPC .......... G09B 19/24; B23K 9/09; B23K 9/095; B23K 9/0953
USPC ................................................. 434/219, 234
See application file for complete search history.

(56) References Cited

U.S. PATENT DOCUMENTS

| | | |
|---|---|---|
| 6,499,272 B2 | 12/2002 | Thieman |
| 6,907,713 B2 | 6/2005 | Thieman |
| 6,908,272 B2 | 6/2005 | Nilsen |
| 6,918,230 B2 | 7/2005 | Thieman |
| 6,962,034 B2 | 11/2005 | Thieman |
| 7,254,873 B2 | 8/2007 | Stolmeier |
| 7,320,662 B2 | 1/2008 | Thieman |
| 7,383,675 B2 | 6/2008 | Thieman |
| 7,540,662 B2 | 6/2009 | Thieman |
| 7,552,573 B2 | 6/2009 | Thieman |
| 7,839,416 B2 * | 11/2010 | Ebensberger .......... G09B 11/10 345/592 |
| 8,127,517 B2 | 3/2012 | Thieman |
| 8,657,605 B2 | 2/2014 | Wallace |
| 8,747,116 B2 | 6/2014 | Zboray et al. |

(Continued)

FOREIGN PATENT DOCUMENTS

| CN | 102165504 A | 8/2011 |
|---|---|---|
| CN | 103038804 A | 4/2013 |

(Continued)

OTHER PUBLICATIONS

US 8,986,013 B2, 03/2015, Albrecht (withdrawn)

(Continued)

*Primary Examiner* — Robert J Utama
(74) *Attorney, Agent, or Firm* — McAndrews, Held, Malloy, Ltd.

(57) ABSTRACT

A weld training device to provide a trainee with a real-world look and feel of a welding torch without the need to provide a welding arc. The weld training device provides adaptive vibration to simulate a welding operation. The weld training tracks performance and provides feedback to a trainee via a local display and/or via a communication to an external computing device.

20 Claims, 6 Drawing Sheets

(56) References Cited

U.S. PATENT DOCUMENTS

| | | |
|---|---|---|
| 8,834,168 B2 | 9/2014 | Peters |
| 8,851,896 B2 | 10/2014 | Wallace |
| 8,911,237 B2 | 12/2014 | Postlethwaite |
| 8,915,740 B2 | 12/2014 | Zboray |
| 9,011,154 B2 | 4/2015 | Kindig |
| 9,067,271 B2 | 6/2015 | Kadlec |
| 9,101,994 B2 | 8/2015 | Albrecht |
| 9,196,169 B2 | 11/2015 | Wallace |
| 9,280,913 B2 | 3/2016 | Peters |
| 9,293,056 B2 | 3/2016 | Zboray |
| 9,293,057 B2 | 3/2016 | Zboray |
| 9,318,026 B2 | 4/2016 | Peters |
| 9,352,411 B2 | 5/2016 | Batzler |
| 9,368,045 B2 | 6/2016 | Becker |
| 9,511,443 B2 | 12/2016 | Pfeifer |
| 9,522,437 B2 | 12/2016 | Pfeifer |
| 2009/0298024 A1 | 12/2009 | Batzler |
| 2013/0189657 A1* | 7/2013 | Wallace .................. G09B 25/02 434/234 |
| 2013/0189658 A1* | 7/2013 | Peters ...................... G09B 5/06 434/234 |
| 2014/0272835 A1* | 9/2014 | Becker .................. B23K 9/0953 434/234 |
| 2014/0312020 A1 | 10/2014 | Daniel |
| 2015/0154884 A1 | 6/2015 | Salsich |
| 2015/0190887 A1* | 7/2015 | Becker .................. B23K 31/12 228/103 |
| 2015/0194072 A1* | 7/2015 | Becker .................... B23K 9/30 434/234 |
| 2015/0348441 A1 | 12/2015 | Zboray |
| 2015/0356888 A1 | 12/2015 | Zboray |
| 2016/0049085 A1 | 2/2016 | Beeson |
| 2016/0089751 A1 | 3/2016 | Batzler |
| 2016/0093233 A1 | 3/2016 | Boulware |
| 2016/0155358 A1 | 6/2016 | Zboray |
| 2016/0155359 A1 | 6/2016 | Zboray |
| 2016/0155360 A1 | 6/2016 | Zboray et al. |
| 2016/0155361 A1 | 6/2016 | Peters |
| 2016/0189559 A1 | 6/2016 | Peters |
| 2016/0203732 A1 | 7/2016 | Wallace |
| 2016/0203733 A1 | 7/2016 | Wallace |
| 2016/0214198 A1 | 7/2016 | Hsu |
| 2016/0214200 A1 | 7/2016 | Beeson |
| 2016/0228971 A1 | 8/2016 | Kowaleski |
| 2016/0250706 A1 | 9/2016 | Beeson |
| 2016/0250723 A1 | 9/2016 | Albrecht |
| 2016/0267806 A1 | 9/2016 | Hsu |
| 2016/0307460 A1 | 10/2016 | Peters |
| 2016/0318114 A1 | 11/2016 | Kowaleski |
| 2016/0321954 A1 | 11/2016 | Peters |
| 2016/0343268 A1 | 11/2016 | Postlethwaite |
| 2016/0358503 A1 | 12/2016 | Batzler |
| 2016/0361776 A1 | 12/2016 | Zhang |
| 2018/0130377 A1 | 5/2018 | Meess |

FOREIGN PATENT DOCUMENTS

| | | |
|---|---|---|
| CN | 104620304 A | 5/2015 |
| CN | 105190725 A | 12/2015 |
| CN | 105210131 A | 12/2015 |
| CN | 105531750 A | 4/2016 |
| CN | 105981087 A | 9/2016 |
| CN | 106062856 A | 10/2016 |
| CN | 106846986 A | 6/2017 |
| DE | 202013011845 U1 | 10/2014 |
| EP | 3318361 A1 | 5/2018 |
| EP | 3323547 A1 | 5/2018 |
| KR | 20140005324 A | 1/2014 |
| KR | 20150136083 A | 12/2015 |
| WO | 2009060231 A1 | 5/2009 |
| WO | 2009146359 A1 | 12/2009 |
| WO | 2014140710 A1 | 9/2014 |

OTHER PUBLICATIONS

PCT, Notification of Transmittal of the International Search Report and the Written Opinion of the International Searching Authority, or the Declaration, dated Nov. 5, 2019 (13 pages).

European Patent Office Action, Application No. 19752618.9, dated Mar. 11, 2022, 7 pages.

* cited by examiner

SYSTEM AND METHOD FOR WELD TRAINING

CROSS REFERENCE TO RELATED APPLICATIONS

The present application claims the benefit of U.S. Provisional Patent Application Ser. No. 62/714,501 filed Aug. 3, 2018, entitled "SYSTEM AND METHOD FOR WELD TRAINING." The entire contents of U.S. Provisional Patent Application Ser. No. 62/714,501 are expressly incorporated herein by reference.

BACKGROUND

The present disclosure relates generally to welding and, more particularly, to a weld training apparatus, system, and method.

Welding is a process that has increasingly become ubiquitous in all industries. While such processes may be automated in certain contexts, a large number of applications continue to exist for manual welding operations, the success of which relies heavily on the proper use of a welding gun or torch by a welding operator. For instance, improper torch angles (work and travel angles), contact tip-to-work distance, travel speed, and aim are parameters that may dictate the quality of a weld. Even experienced welding operators, however, often have difficulty monitoring and maintaining these important parameters throughout welding processes.

SUMMARY

Methods and systems are provided for weld training including a low cost weld training device that simulates the look and feel of a real weld torch, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Conventional weld training systems may use virtual reality, augmented reality, or other training methods. As may be appreciated, these training systems may be expensive to acquire and operate. Accordingly, welding training institutions may only acquire a limited number of such training systems. Therefore, welding operators being trained by the welding training institutions may have a limited amount of time for hands-on training using the training systems.

Disclosed example methods and apparatus provide cost-effective weld training devices and/or systems for hands-on weld training. Disclosed example weld training torches provides a look and feel of a real-world welding torch. Disclosed weld training torches simulate the tactile feel of arc-on welding torches, without an actual welding arc, via a vibration device included in the weld training torch. Additionally or alternatively, disclosed weld training torches provide audio feedback and/or simulated welding arc sounds via a speaker included in the weld training torch. The weld training torch may also communicate with an external computing device, such as a smartphone, to provide feedback to the trainee as well as allow a trainee to program and interact with the weld training torch.

Disclosed example weld training torches for performing a simulated welding operation include: a torch body including a handle and a neck; at least one of a trigger and a proximity sensor coupled to the handle; a proximity sensor configured to detect a proximity between the tip and a workpiece; a tip extending from a distal end of the neck of the torch body to simulate a welding wire, the tip coupled to the torch body; and a vibration module within the torch body and mechanically coupled to the tip, the vibration module configured to vibrate in response to the detection of at least one of the trigger actuation or a proximity between the tip and the workpiece during the simulated welding operation.

Some disclosed example weld training torches further include: a communications device to communicate with an external computing device; and control circuitry configured to: receive a command via the communications device indicating a welding operation to be simulated with the weld training torch; select a vibration pattern based on the indicated welding operation; and control the vibration module to output the vibration pattern.

Some disclosed example weld training torches further include: a user interface; and control circuitry configured to: receive a command via the user interface indicating a welding operation to be simulated with the weld training torch; select a vibration pattern based on the indicated welding operation; and control the vibration module to output the vibration pattern.

In some example weld training torches, the control circuitry is configured to: monitor at least one of a pressure applied to the tip via a pressure sensor, a travel speed of the tip via a travel speed sensor, or an orientation of the torch body via an accelerometer, during a simulated welding operation; adjust the vibration pattern in response to at least one of the monitored pressure applied to the tip, the travel speed of the tip, or the orientation of the torch body.

Some disclosed example weld training torches further include a camera configured to record the simulated welding operation.

Some disclosed example weld training torches further include a camera configured to record the simulated welding operation; and a communications device configured to transmit the recorded simulated welding operation to an external computing device.

Some disclosed example weld training torches further include a speaker configured to provide simulated arc sounds during the simulated welding operation.

Some disclosed example weld training torches further include control circuitry configured to receive a command indicating a welding operation to be simulated with the weld training torch, and the simulated arc sounds are selected based on the indicated welding operation.

In some example weld training torches, the control circuitry is configured to: receive a command indicating a welding operation to be simulated with the weld training torch; and provide, via the speaker, audio instructions to complete the indicated welding operation.

In some example weld training torches, the control circuitry is configured to provide the audio instructions in real-time during the simulated welding operation.

Some disclosed example weld training torches further include: a display; and control circuitry configured to: receive a command indicating a welding operation to be simulated with the weld training torch; and provide instructions to complete the indicated welding operation, via the display.

Some disclosed example weld training torches further include: a pressure sensor configured to measure a pressure applied to the tip; and control circuitry coupled to the pressure sensor and configured to adjust an output of the vibration module based on the pressure measured by the pressure sensor.

Some disclosed example weld training torches further include: a travel speed sensor to monitor the travel speed of the tip; and control circuitry coupled to the travel speed sensor and configured to adjust an output of the vibration module based on the travel speed of the tip determined by the travel speed sensor.

Some disclosed example weld training torches further include: a position sensor to track the orientation of the torch body; and control circuitry coupled to the position sensor and configured to adjust an output of the vibration module based on the orientation of the torch body determined by the position sensor.

Some disclosed example weld training torches further include: control circuitry configured to monitor and store data representative of at least one of a pressure applied to the tip, a travel speed of the tip, or an orientation of the torch body during a simulated welding operation.

Some disclosed example weld training torches further include: a communications device configured to communicate with an external computing device, and the control circuitry is configured to transmit the data stored during a simulated welding operation to the external computing device.

In some disclosed example weld training torches, the control circuitry is configured to: compare the data stored during the simulated welding operation to predetermined target data associated with the simulated welding operation; and provide feedback, via one of a display coupled to the torch body or a speaker coupled to the torch body, to an operator based on the compared data.

Some disclosed example weld training torches further include: a laser pointer configured to provide a position guide on the workpiece.

In some disclosed example weld training torches, the length of the tip is adjustable.

Some disclosed example weld training torches further include a battery to power the weld training torch.

Figure 1A:
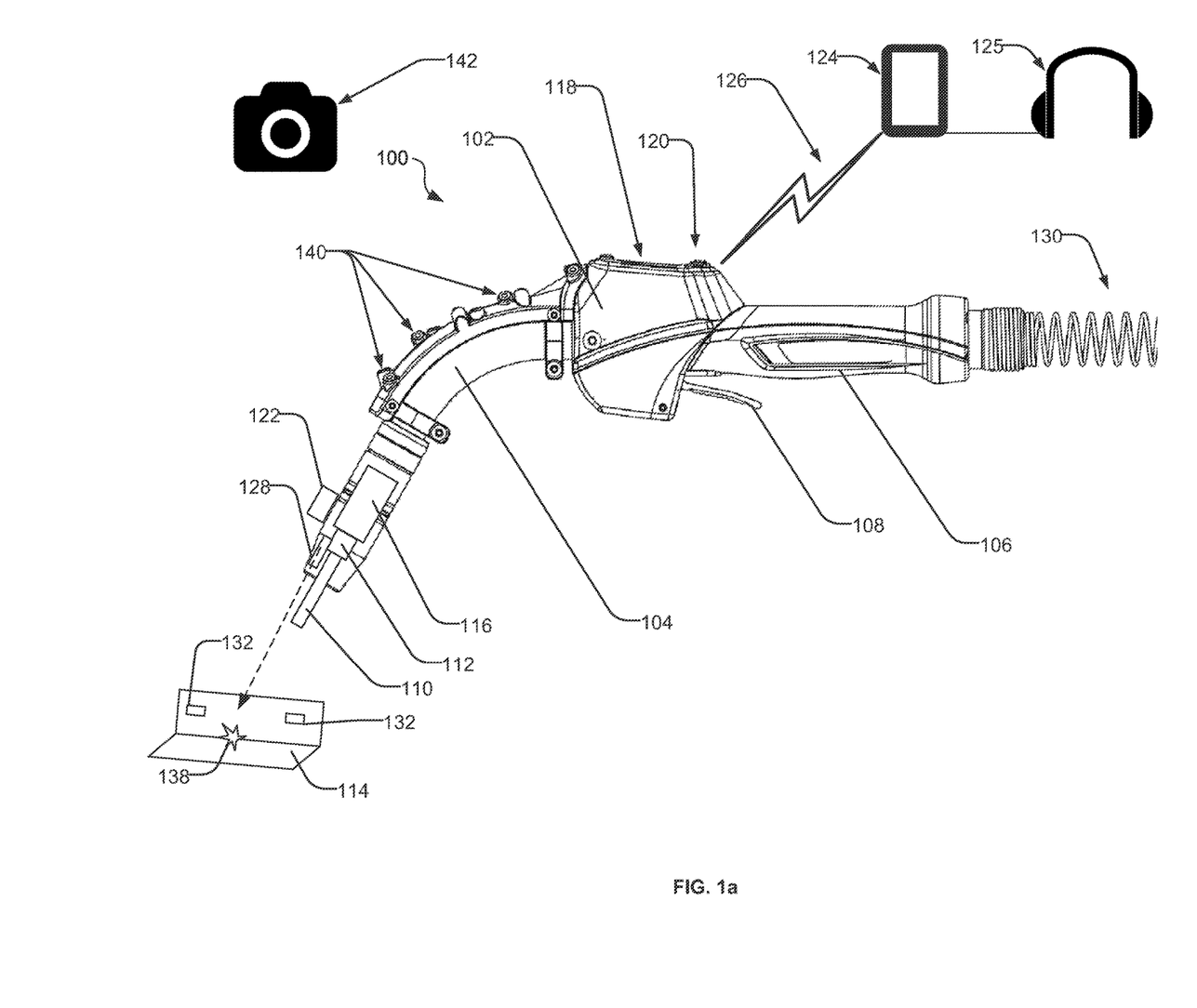
FIG. 1a illustrates a perspective view of an example weld training torch and system.

FIG. 1a illustrates a perspective view of an example weld training torch 100. While the example weld training torch 100 of FIG. 1 is specifically presented as a gas metal arc welding (GMAW) type welding torch, a weld training torch 100 as described in this disclosure may be used to simulate various welding-type processes (e.g., flux-cored arc welding, flux-cored arc welding-gas shielded, gas tungsten arc welding (including tungsten inter gas welding), shielded metal arc welding, plasma cutting, etc.). The weld training torch 100 has a torch body 102, a torch neck 104, and a handle 106. The example torch body 102, torch neck 104, and handle 106 are made of plastic for ease and economy of manufacturing, but may be constructed using molded plastic or rubber, metal, and/or other materials typical of actual welding torches. The plastic torch body 102, the torch neck 104, the handle 106 and/or, more generally, the weld training torch 100, may be weighted to mimic the weight and feel of a real welding torch, such as a metal inter gas ("MIG") gun. The weld training torch 100 has a trigger 108, which starts and stops a welding simulation based on depressing or releasing the trigger 108. The weld training torch 100 also has a mock stick out wire (tip) 110 extending from the neck 104. The tip 110 may be removable from the weld training torch 100, such that the tip 110 may be replaced. The weld training torch may accommodate various types of tips 110 to simulate different types of welding wire. For example, the diameter of the tips 110 may be changed to represent wires having different diameters. The length of the tip 110 may also be adjustable to simulate multiple types of welding processes and welding wires.

The tip 110 connects to the weld training torch via a tip interface 112. The tip interface 112 may include a proximity sensor, such as a pressure transducer. The proximity sensor allows control circuitry of the weld training torch to determine whether the tip is within a threshold proximity of a workpiece 114. The weld training torch 100 also has a vibration device 116 which vibrates to simulate the tactile feel of an arc-on welding torch. The vibration device may include a vibrational motor, a piezo-electric device, weighted rotating cam, an air bladder, magnets, electromagnets, and/or any other actuator or apparatus capable of being controlled to provide vibration.

The workpiece 114 may be one or more pieces of metal, a sheet of paper, a flat surface such as a table, a tablet computer screen, etc. In examples where the workpiece 114 is a tablet computer screen, the screen may simulate the formation of a weld pool during the simulated welding operation.

Figure 1B:
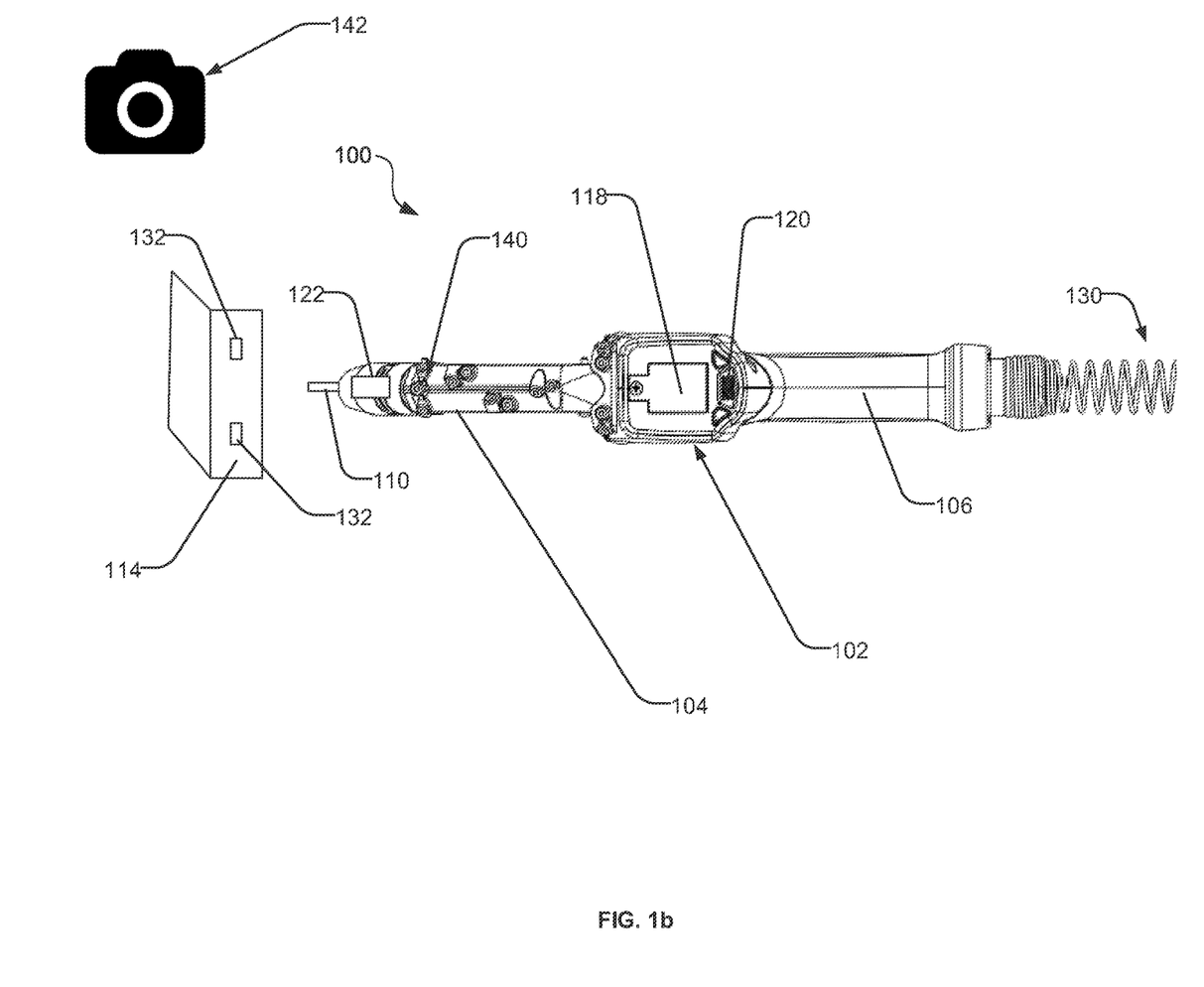
FIG. 1b illustrates a top down view of an example weld training torch and system.

FIG. 1b illustrated a top view of the example weld training torch 100. As illustrated in FIG. 1b, the weld training torch 100 includes a user interface 118, such as a touchscreen display. The weld training torch 100 also includes speakers 120, which can provide audio training feedback and/or simulated arc sounds. The user interface 118 can be used to program the weld training torch 100. For example, the user interface 118 may be used to select a welding operations and/or parameters, and/or workpiece characteristics, to simulate. The user interface 118 also gives visual feedback to the operator. The visual feedback may be user readable text, photographs, video, simulated graphics, a visual indication of torch orientation, or a combination thereof.

The parameters selected by the user may be used by the weld training torch 100 to affect the vibration, audio feedback, visual feedback, and/or other aspects of the weld training operations. For example, if the user selects voltage or wire feed speed parameters that are outside of recommended values, the vibration device 116, the speakers 120, and/or the workpiece 114 or other display device may provide vibration feedback, audio feedback, and/or visual feedback to mimic erratic and/or irregular arc behavior that would occur while welding using the selected parameters. In other examples, if the user selects an incorrect welding gas type or flow rate for the welding process, workpiece type, and/or wire type, the vibration device 116, the speakers 118, and/or the workpiece 114 or other display device may provide vibration feedback, audio feedback, and/or visual feedback to mimic the effects of sub-optimal gas flow. Conversely, when appropriate (e.g., "ideal" or optimal) parameters are selected (by the user or automatically), and the user achieves the appropriate travel speed, work angle, and travel angle, the vibration device 116, the speakers 118, and/or the workpiece 114 or other display device may provide vibration feedback, audio feedback, and/or visual feedback to mimic a quality weld (e.g., the "crackling bacon noise"

The camera(s) 122 can be used to capture photographs or video of a simulated welding operation. The photographs or video can then be displayed to the user via the user interface 118 or an external computing device 124, such as a smartphone. The weld training torch may communicate with a smartphone 124 via a communications link 126. The communication link 126 may use any suitable protocols such as Bluetooth, Bluetooth Low Energy, WiFi, Z-Wave, Zigbee, UDP, TFTP, lwIP, HTTP, RFID and/or the like. The communications link 126 may also be a wired connection. The smartphone 124 may be used to provide feedback to the trainee as well as allow a trainee to program and interact with the weld training torch. In some examples, an external speaker, such as a speaker of the smartphone 124, provides the audio feedback or simulated arc sounds during the simulated welding operation. In some examples, the trainee may receive audio feedback or simulated arc sounds from headphones 125. The headphones 125 may be connected to the smartphone 124 or a headphone jack (not shown) in the weld training torch 100. The headphones 125 may also be wirelessly connected to the smartphone 124 and/or the weld training torch 100.

The weld training torch 100 may also include a laser 128 or other focused light device such as a focused LED. The laser 128 may act as a guide for the trainee, indicating to the trainee where the simulated weld pool would form on the workpiece 114 based on the current position and orientation of the weld training torch 100. As will be explained in more detail below, the weld training torch may include one or more sensors, such as an accelerometer or cameras 122, that control circuitry of the weld training torch may use to determine a position, and orientation (angle and pitch) of the weld training torch.

The weld training torch 100 may include one or more optical sensors 140. The optical sensors 140 may also be used in conjunction with an external camera 140 to determine a travel speed, and orientation of the weld training torch 100, and the tip 110 to workpiece 114 distance. Commonly owned U.S. Pat. No. 9,522,437 to Pfeifer et. al and U.S. Pat. No. 9,101,994 to Albrecht, describe a travel speed sensing systems using optical sensors. The entireties of U.S. Pat. Nos. 9,522,437 and 9,101,994 are incorporated herein by reference.

In some examples, the weld training torch 100 is powered by a cord 130 that plugs into an external power source, such as AC grid power. In some examples, the weld training torch 100 is battery powered, which allows the weld training torch 100 to be cordless and completely mobile.

Figure 1C:
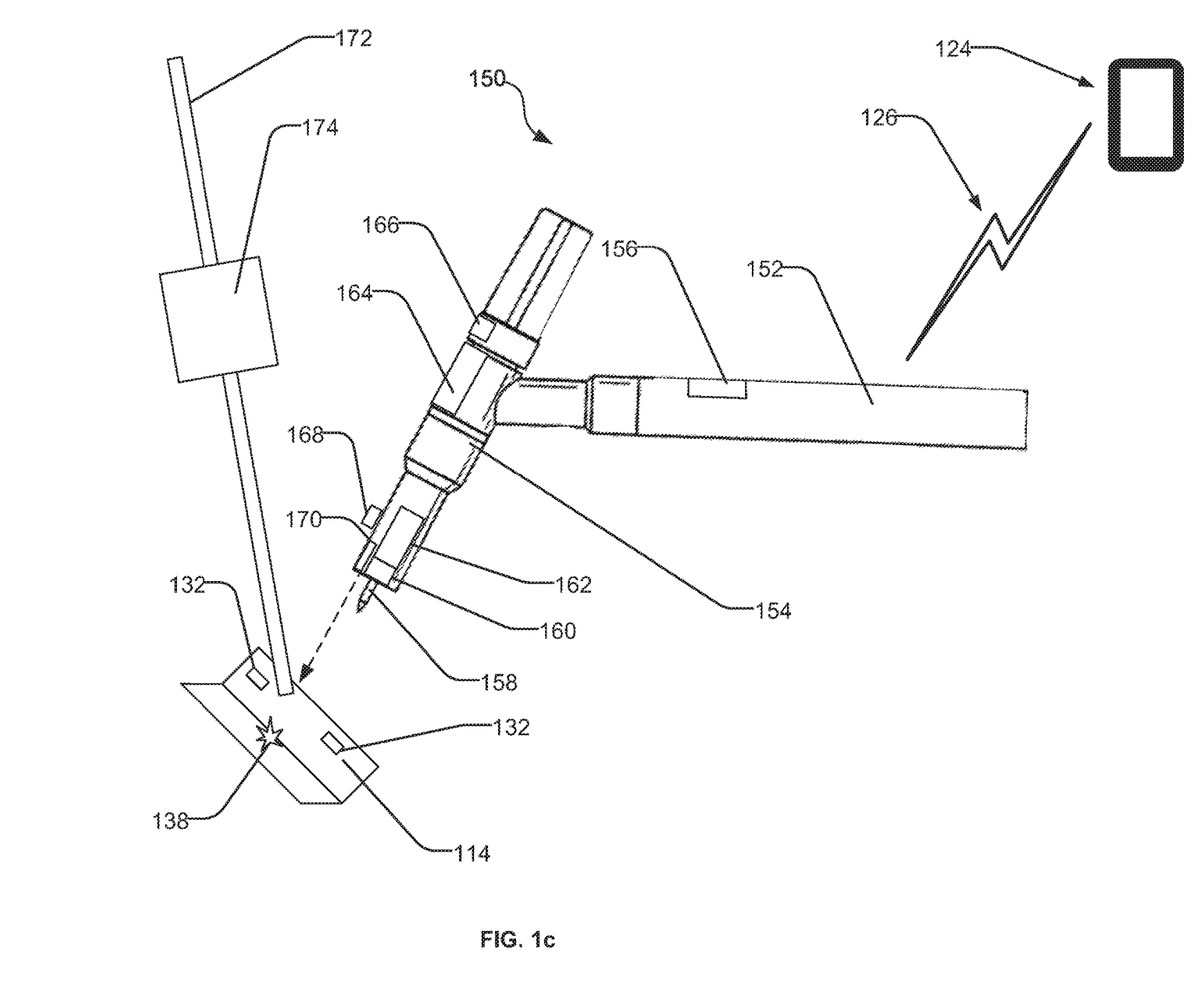
FIG. 1c illustrates a perspective view of an example weld training torch and system adapted to simulate a TIG welding process.

FIG. 1c illustrates another example weld training torch 150 that can be used to simulate a TIG welding process. The weld training torch 150 includes a torch body 152 and a torch neck 154. The example torch body 152 and torch neck 154 are made of plastic for ease and economy of manufacturing, but may be constructed using molded plastic or rubber, metal, and/or other materials typical of actual welding torches. The plastic torch body 152, the torch neck 154, and/or, more generally, the weld training torch 150, may be weighted to mimic the weight and feel of a real TIG welding torch. The weld training torch 150 has a switch 156, which starts and stops a welding simulation based on manipulating the switch 156. The weld training torch 150 also has a mock tungsten electrode 158 extending from the neck 154. The mock tungsten electrode 158 may be removable from the weld training torch 100, such that the mock tungsten electrode 158 may be replaced. The weld training torch also has a proximity sensor 160 a vibration device 162, a user interface 164, a speaker 166, one or more cameras 168, and a laser 170, as described with relation to the weld training torch 100 of FIG. 1a.

As illustrated in FIG. 1c, to simulate a TIG welding process, a trainee may hold a simulated welding filler rod 172. The camera(s) 168 may sense the presence of the welding filler 172. As will be explained in more, the simulated welding operation is adaptive based on sensed parameters, including the position of the welding filler 172. A retraction device 174 may retract the welding filler during the simulated welding operation to simulate the deposition of the welding filler 172 onto a workpiece 114 during the simulated welding operation.

Figure 2:
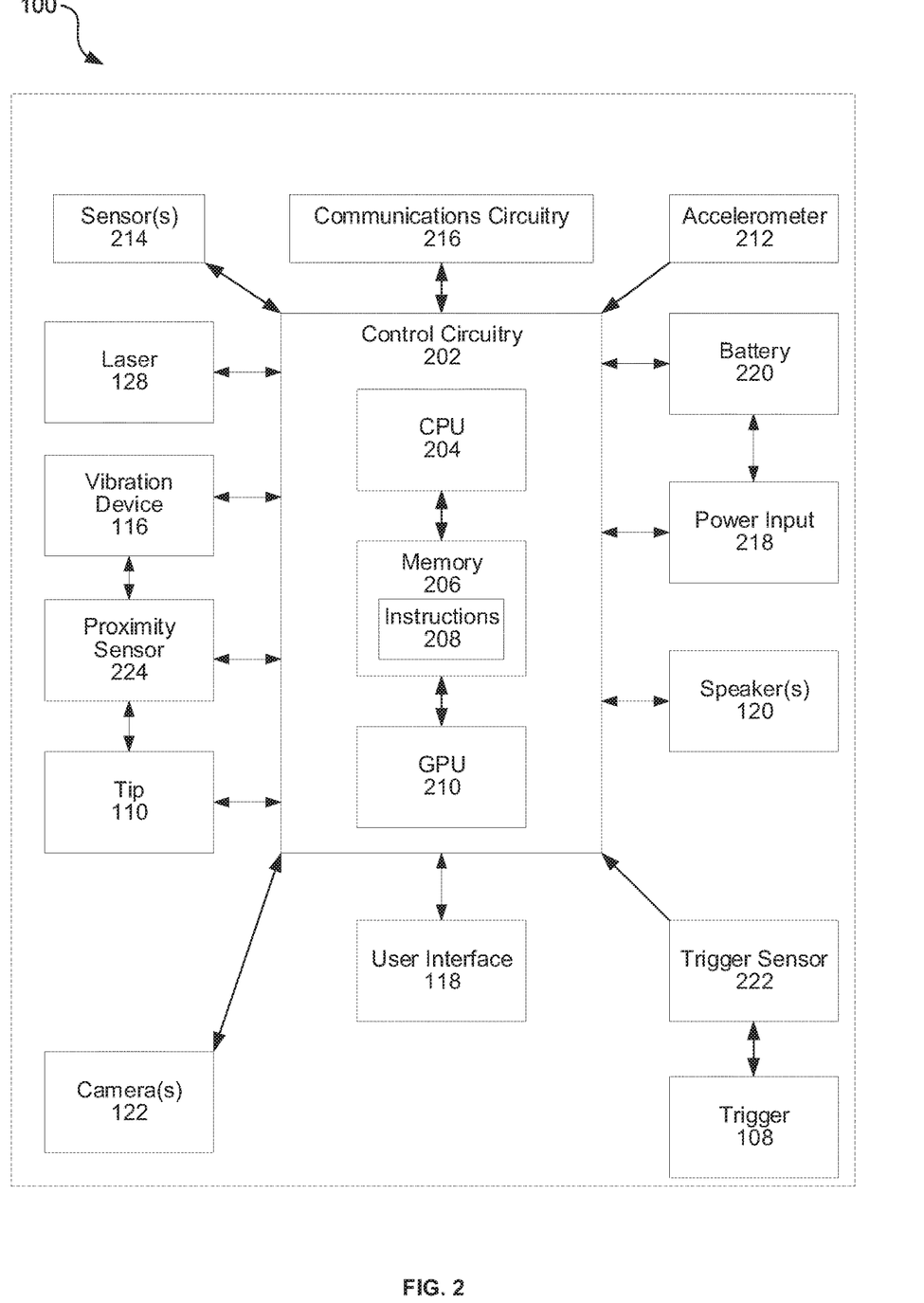
FIG. 2 shows a block diagram of an example weld training torch.

FIG. 2 is a block diagram of the weld training torch 100 of FIGS. 1a and 1b. The weld training torch 100 includes control circuitry 202. In some examples, control circuitry 202 includes a central processing unit ("CPU") 204, memory 206, instructions 208 stored in memory 206, and a graphics processing unit ("GPU") 210. The weld training torch also includes an accelerometer 212 and/or other position sensors 214 coupled to the control circuitry. The camera(s) 122 are also coupled to the control circuitry, and may be controlled specifically by the GPU 210. The accelerometer 212, the camera(s) 122, and/or the other position sensors 214 may be used by the control circuitry 202 to determine the position and orientation of the weld training torch 100.

The weld training torch 100 also includes communications circuitry 216 coupled to the control circuitry 202. The communications circuitry 216 allows for communication with an external computing device, such as a smartphone via communications link 126. The communications circuitry 216 may allow communication via any suitable protocol, such as Bluetooth, Bluetooth Low Energy, WiFi, Z-Wave, Zigbee, UDP, TFTP, lwIP, HTTP, RFID and/or the like.

The weld training torch 100 also includes a power input for receiving power 218 from an external power source. In some examples, the weld training torch 100 includes a battery 220, which allows the weld training torch 100 to be cordless and completely mobile.

The weld training torch also includes a trigger sensor 222 coupled to the control circuitry 202, which detects when the trigger 108 is activated or released. The laser 128, the tip 110, the vibration device 116, and a proximity sensor 224 are also coupled to the control circuitry 202. The proximity sensor 224 detects when the tip 110 is within a threshold distance of a workpiece 114. In some examples, the proximity sensor 224 is a pressure transducer, which measures a pressure applied to the tip 110 when the tip is touching the workpiece 114. In some examples, the proximity sensor 224 is an optical sensor, which detects proximity between the tip 110 and the workpiece 114. In some examples, the workpiece 114 may generate a magnetic field, and the proximity sensor is a Hall Effect sensor. In some examples, proximity to the workpiece 114 is determined via image processing via video captured by the camera(s) 122. The user interface 118 is also coupled to the control circuitry 202.

While example implementations of the weld training torch are described with reference to FIG. 2, other implementations may be used. For example, the GPU 210, the CPU 204, the communications circuitry 216, and the memory 206 may be implemented using hardware, software, firmware, and/or any combination of hardware, software, and/or firmware. For example, components may be added, removed, replaced, combined, divided, and/or otherwise modified from the illustrated example. The CPU 204, the GPU 210, the speaker 120, accelerometer 224, the display driver 208, the sensors 214, the trigger sensor 222, the memory 206, and the communications circuitry 216 may be implemented using one or more integrated circuits and/or discrete circuits, such as general purpose processors, special purpose processors (e.g., digital signal processors), programmable logic devices, application specific integrated circuits (ASICs), systems-on-chip (SoCs), and/or any other type and/or combination of types of integrated and/or discrete circuits. Furthermore, implementations may include combinations of components and/or functions into single integrated circuit packages and/or divisions of components and/or functions into multiple integrated circuit packages.

The weld training torch 100 simulates the real world look, sound, and feel of arc welding operations without a live arc. The vibration device 116 simulates the actual vibrations a welding operator feels when operating an arc-on welding torch. The vibration device may include a vibrational motor, a piezo-electric device, weighted rotating cam, an air bladder, magnets, or electromagnets. The vibration device 116 vibrates the weld training torch 100 at a frequency simulating actual vibrations during a welding operation. For example, the vibration device may vibrate at 60 Hz to simulate GMAW welding, 60 to 200 Hz to simulate AC TIG welding, or several hundred Hz to simulate TIG or MIG pulse welding. Depending on a selected welding operation, the vibration device may be controlled to output a vibration pattern to simulate the actual vibrations caused by arc welding.

The speaker 120 also simulates real world arc sounds during a welding operation. Simulated sounds may be selected based on the selected welding operation. The laser 128 provides a position guide for the trainee, and also may simulate a weld pool that forms during the welding operation.

The control circuitry 202 uses the accelerometer 212, the other sensors 214 (including motion sensors), and/or the camera(s) 122 to determine the position and orientation of the weld training torch 100 relative to a workpiece 114. For example, during operation, the control circuitry 202 may be configured to use the accelerometer 212 to detect a motion (e.g., acceleration, etc.) associated with the weld training torch 100. The control circuitry 202 may use the detected acceleration to perform various events. For example, the control circuitry 202 may cause the vibration device 116 to update the output vibration pattern in response to determining that the weld training torch 100 has rotated or translated. In some examples, the control circuitry 202 may cause the speaker 120 to update the simulated arc sounds based on the detected movement. In some examples, the control circuitry 202 may cause the speaker to provide real-time feedback to the trainee based on the sensed movement. For example, if the travel speed is too high or too low for the selected weld process, the speaker 120 may provide audio feedback to the trainee indicating that the weld travel speed is too high or too low. In some examples, the control circuitry 202 may cause the vibration device 116 to provide haptic feedback based on the sensed movement. For example, if the travel speed is too high or too low for the selected weld process, the vibration device may provide vibrate at a different known pattern or rate to indicate to the trainee that the weld travel speed is too high or too low. For example, the vibration device may indicate the travel speed is too high by increasing the vibration frequency, and may indicate that the travel speed is too low by decreasing the vibration frequency.

In some examples, the control circuitry 202 may also use the camera(s) 122 to determine the position of the welding torch 100 relative to the workpiece 114. The workpiece may have markings (132 in FIG. 1) which the control circuitry 202 may use to determine the position and orientation of the weld training device relative to the workpiece.

The control circuitry 202 also uses the proximity sensor 224 to determine the proximity of the tip 110 to the workpiece 114. The control circuitry 202 may use the detected proximity of the tip 110 to the workpiece 114 to perform various events. For example, the control circuitry 202 may cause the vibration device 116 to update the output vibration pattern in response to determining that the weld training torch has moved closer to the workpiece 114 or further from the workpiece 114. In some examples, the control circuitry 202 may cause the speaker 120 to update the simulated arc sounds based on the detected movement. In some examples, the control circuitry 202 may cause the speaker to provide real-time feedback to the trainee based on the sensed tip 110 to workpiece 114 proximity. For example, if the tip 110 proximity to the workpiece 114 for the selected weld process is too close or too far, the speaker 120 may provide audio feedback to the trainee indicating that the proximity is too close or too far. In some examples, the control circuitry 202 may cause the vibration device 116 to provide haptic feedback based on the sensed movement. For example, if the travel speed is too high or too low for the selected weld process, the vibration device may provide vibrate at a different known pattern or rate to indicate to the trainee that the proximity is too close or too far. For example, the vibration device may indicate the proximity is too close by increasing the vibration frequency, and may indicate that the proximity is too low by decreasing the vibration frequency.

A trainee may select a welding operation to simulate via the user interface 118 or via an external device, such as a smartphone 124. The baseline vibration pattern output by the vibration device 116 is selected based on the trainee selected welding operation. For example, the trainee may input into the user interface 118 a simulated welding operation (e.g., MIG welding); simulated welding wire type; simulated workpiece type; simulated voltage, etc., and the control circuitry 202 may select a baseline vibration pattern based on the user selected inputs. For example, the control circuitry 202 may select a 60 Hz baseline pattern for GMAW welding. Other weld parameters may also be determined based on the selected welding operation. For example, an ideal weld travel speed and tip 110 to workpiece 114 proximity may be selected based on the selected welding operation to simulate. The feedback provided by the speaker 120, the user interface 118, and/or the smartphone 124 is selected based on these determined parameters.

When the trainee pulls the trigger 108, the simulated welding operation begins, and the control circuitry 202 begins to monitor the weld training torch 100 position and orientation relative to the workpiece 114, and the tip 110 to workpiece 114 proximity. The speaker 120 may also begin to give the trainee real time instructions for completing the simulated welding operation. Once the control circuitry 202 determines that the tip 110 is within a close enough proximity to the workpiece 114 that a real world arc would be created between the workpiece 114 and the tip if actual welding-type power was provided to the welding torch, the control circuitry 202 begins the simulated welding operation. In some examples, the simulated welding operation begins when the proximity sensor 224 determines that the tip 110 has made contact with the workpiece 114. In such examples, the proximity sensor 224 may be a pressure transducer. In some examples, the weld training torch 100 may be used to simulate non-contact welding processes. In such examples, the simulated welding operation begins when the proximity sensor determines that the tip 110 is within a threshold distance of the workpiece 114 to create a real-world welding arc.

During the simulated welding operation, the speaker 120 plays realistic arc sounds, and the vibration device 116 vibrates based on the selected welding pattern. The vibration pattern is then updated in real time based on the selected welding operation, the sensed position and orientation of the weld training torch 100, and the sensed tip 110 to workpiece 114 proximity. For example, the vibration frequency may decrease from the baseline frequency if the proximity is too far, and increase from the baseline frequency if the proximity is too low. Similarly, the vibration frequency may decrease from the baseline frequency if the travel speed is too high, and increase from the baseline frequency if the travel speed is too low. If the sensed tip 110 to workpiece 114 proximity and sensed travel speed are within a threshold of the ideal determined values, then the vibration device 116 vibrates at the determined baseline frequency.

During the simulated welding operation, the control circuitry 202 tracks and stores in memory 206 the measurements of the proximity sensor 224, the accelerometer 212, the other sensors 214, and video captured by the camera(s) 122. During the simulated welding operation, the control circuitry 202 compares the tracked measurements to reference parameters for the selected simulated welding operation. The control circuitry 202 then provides real-time feedback to the user via the vibration device 116 or the speaker 120 during the simulated welding operation. After the simulated welding operation, the control circuitry 202 may compare the tracked and stored measurements to reference parameters stored in memory 206. The weld training torch 100 may then provide feedback via the user interface 118 and/or the speaker 120 to the trainee based on the compared parameters. In some examples, the feedback may be provided to the trainee via the smartphone 124. In some examples, the tracked measurements are sent via the communications link 126 to the smartphone 124. The smartphone 124 compares the tracked measurements to reference parameters for the simulated welding operation stored in memory of the smartphone 124. The smartphone 124 then provides feedback to the trainee. The feedback may also include video of the simulated welding operation captured by the camera(s) 122.

Once the trigger 108 is pulled, the laser 128 may also turn on to act as a position guide on the workpiece for the trainee. The visual pattern 138 produced by the laser 128 may also simulate a weld pool 138 on the workpiece 114. For example, as the weld training torch 100 hovers over a certain area on the workpiece 114, the radius of the laser point on the workpiece 114 may increase, to simulate an expanding weld pool 138. The color of the laser 128 may also change to provide feedback to the trainee. For example, a green laser may indicate that the travel speed is within the ideal range, while a red laser may indicate that the travel speed is too fast or too slow. In some examples, a red simulated weld pool 138 may indicate a weld pool 138 that is outside of a threshold of ideal parameters, which a green simulated weld pool 138 may indicate a weld pool 138 that is within a threshold of the ideal parameters.

FIG. 1c illustrates the weld training torch 100 configured to simulate a TIG welding process. As illustrated, a trainee may also hold a welding filler 134. During the simulated welding operation, the camera(s) 122 may also be used by the control circuitry 202 to track the position of the welding filler 134 relative to the workpiece 114 and the tip 110. In such examples, the tip 110 simulates a tungsten welding electrode. The control circuitry 202 may compare the relative positions the welding filler 134, the tip 110, and the workpiece 114 to reference positions for the selected welding process, and provide feedback to the trainee based on the comparison. The feedback may be provided in real time via the speaker 120. The feedback may also be provided via the smartphone 124.

As discussed above in relation to FIG. 1c, in some examples, a weld training torch 150 may simulate a TIG welding process. In such examples, the weld training torch 150 may contain the same internal components as the weld training torch 100 described in FIG. 2. In such examples as illustrated in FIG. 1c, a retraction device 174 may be configured to retract the welding filler 172 to simulate consumption of the welding filler during a simulated welding operation. The retraction device 174 may include a motor and rollers that retract the welding filler 172 away from the workpiece 114. The retraction device may also include communications circuitry which communicates with the control circuitry 202 of the weld training torch 150. The control circuitry 202 then sends commands to the retraction device 174 to retract the welding filler 172 at a commanded rate during the simulated welding operation. For example, when the control circuitry 202 senses that the switch has been turned on, and that the proximity of the mock tungsten electrode and the welding filler 172 is within range of the workpiece 114 to begin the welding operation, the retraction device 174 begins to retract the welding filler 172 away from the workpiece. This retraction teaches a trainee how to hold a welding filler 172 during a simulated welding operation. The rate of retraction of the welding filler 172 may increase or decrease based on the mock tungsten electrode 158 to workpiece 114 proximity, the position the travel speed of the weld training torch 150, the selected simulated welding process, and any other parameter.

Returning to FIG. 1a, the smartphone 124 may also be used to interact with and program the weld training torch 100. For example, the smartphone 124 may be used to provide firmware updates to the weld training torch 100. The smartphone 124 may also be used to select a weld process and/or welding parameters to simulate. For example, a trainee may select a simulated workpiece type, a simulated welding wire type, a simulated voltage, a simulated current, etc. The simulated vibration and audio provided by the weld training torch 100 during the simulated welding operation is selected based on the inputs selected by the trainee on the smartphone 124. The smartphone 124 also provides instructions to the trainee. For example, the smartphone 124 may provide user readable instructions to the trainee for operating the weld training torch 100. The smartphone 124 may also provide audio instructions to the trainee. The smartphone 124 may also provide instructional videos and simulated graphics to instruct the trainee on the use of the weld training torch 100, as well as instructions to improve the trainee's welding technique based on the trainee's simulated welding operations.

Figure 3:
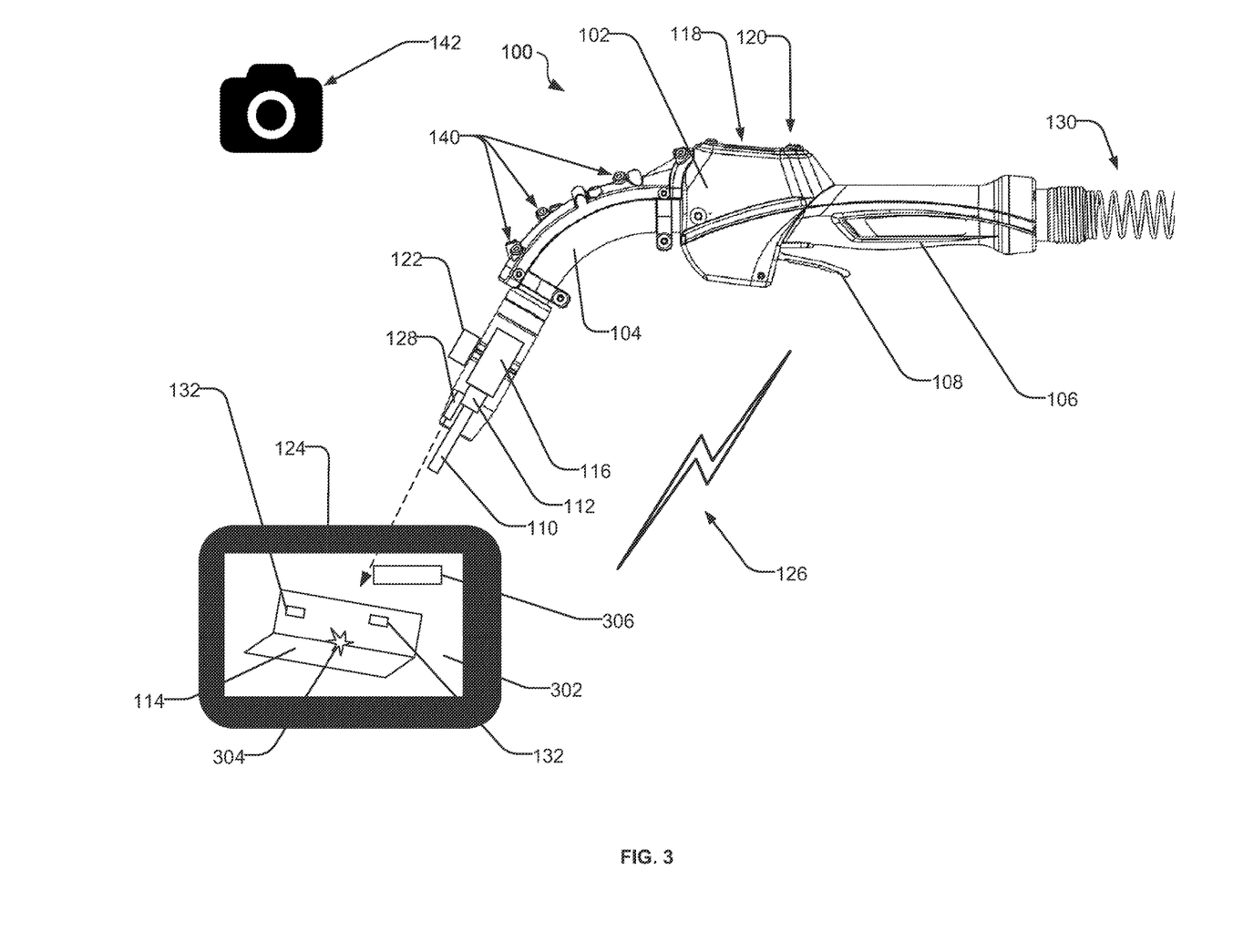
FIG. 3 illustrates a perspective view of an example weld training torch and system.

In some examples, as illustrated in FIG. 3, the smartphone 124 or other tablet computer may be used to simulate a workpiece 114. The smartphone 124 screen 302 may display a workpiece 114. The simulated workpiece 114 may have various markings 132 to which act as position guides for the trainee. The control circuitry 202 may also use the markings 132 to determine the position and orientation of the weld training torch 100 relative to the smartphone screen 302 via processing images received from the camera(s) 122. In some examples, the proximity sensor 224 of the weld training torch 100 detects the proximity of the weld training torch to the screen 302 via detecting light radiated from the screen. As described above, the weld training torch may adjust the vibration pattern and simulated audio based on the tip 110 to screen 302 proximity, as well as the sensed position and orientation of the weld training torch 100 relative to the screen 302.

As described above, the weld training torch 100 may communicate with the smartphone 124 via the communications link 126. As such, the screen may adapt the simulated workpiece 114 in response to the position and movement of the weld training torch during a simulated welding operation to simulate the deposition of welding wire. For example, the smartphone 124 may display a weld pool 304 during the simulated welding operation that is adaptive during the simulated welding operation. For example, as the tip 110 hovers over the weld pool 304, the weld pool 304 may grow in size. Further, the weld pool may move or adapt as the tip 110 moves across the screen 302.

The screen 302 may also provide other visual feedback to the trainee, such as text 306. The text 306 may indicate to the trainee that the tip 110 is too close to the screen 302 or too far away from the screen 302.

Figure 4:
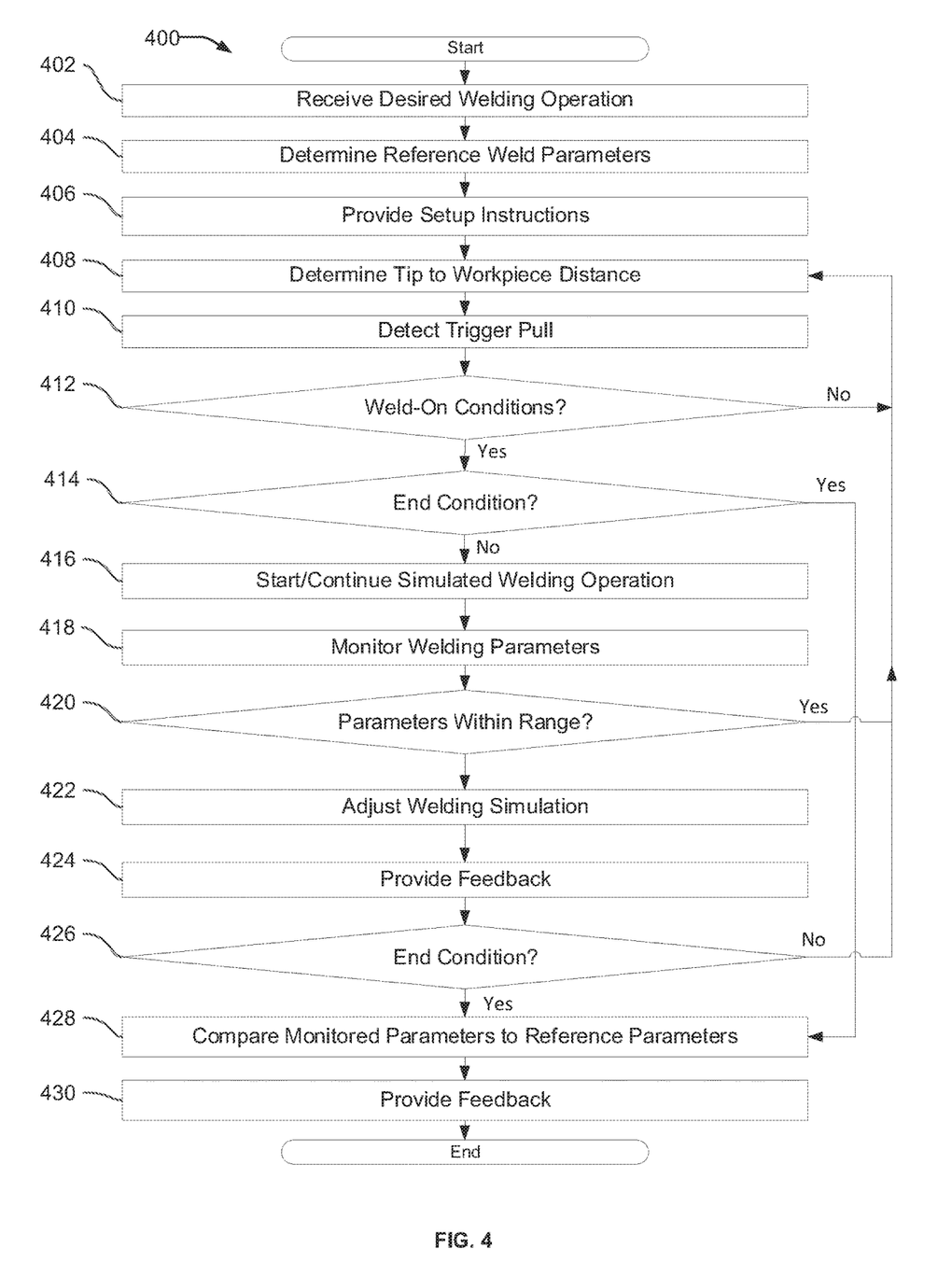
FIG. 4 shows a flowchart of an example method of simulating a welding operation using the disclosed weld training torch.

FIG. 4 is a flow chart of an exemplary method 400 of simulating a welding operation using the weld training torch 100. The example method 400 may be partially or completely implemented by executing machine readable instructions using the control circuitry 202 (i.e., memory 206 and CPU 204) of FIG. 2.

At block 402, the control circuitry 202 received a desired welding operation to simulate. For example, a trainee may select a welding operation to simulate via the user interface 118, or via an application on a smartphone 124. This selection of a welding operation to simulate is then received by the control circuitry 202. At block 404, the control circuitry 202 determines reference parameters for the selected welding operation. For example, the selected reference weld parameters may be stored in memory 206. The reference weld parameters may include tip 110 to workpiece 114 distance, torch travel speed, torch orientation, etc. At block 404, the control circuitry 202 selects instructions for setting up and/or running the simulated welding operation to provide to the trainee. At block 406, the user interface 118 may display the instructions. For example, the user interface 118 may provide text instructions, a video instruction, or simulated graphics instructing the user how to set up and run the simulation. For example, the instruction may include information regarding setting up a simulated workpiece 114 information regarding an ideal tip 110 to workpiece 114 distance; or an ideal travel speed. The instructions may also include information relating to how to begin the simulation.

At block 408, the control circuitry 202 monitors the tip 110 to workpiece 114 distance. For example, as described above, the weld training torch 100 may include a proximity sensor coupled to the control circuitry 202 which the control circuitry 202 may use to determine the tip 110 to workpiece 114 distance. In some examples, the camera(s) 122 may be used to determine the tip 110 to workpiece 114 distance. At block 410, the control circuitry 202 monitors the trigger sensor 222 to determine whether the trigger 108 has been pulled. At block 412, the control circuitry 202 checks if the weld-on conditions are satisfied. The weld-on conditions include the pulled trigger detected at block 410 and a tip 110 to workpiece 114 distance within a threshold proximity. The threshold proximity is the tip 110 to workpiece 114 distance required for a live welding arc to begin in a real world weld for the selected welding operation. If both weld-on conditions are satisfied, then the control circuitry proceeds to block 414. If both weld-on conditions are not satisfied, then the control circuitry returns to block 408 to continue to monitor both weld-one conditions.

At block 414, the control circuitry 202 determines if an end simulation condition exists. For example, the simulation may run for a certain amount of time, and if the time has run out, the end simulation condition exists. In some examples, the trainee may toggle a control on the weld training torch 100 to end the simulation. In some examples, when the trainee releases the trigger 108, an end simulation condition exists. If an end simulation condition exists, the control circuitry 202 proceeds to block 428. If an end simulation condition does not exists, the control circuitry 202 proceeds to block 416.

At block 416, the control circuitry 202 begins the simulated welding operations. The control circuitry 202 commands the vibration device 116 to vibrate at a pattern determined based on the selected welding operation. The control circuitry 202 also commands the speaker 120 to provide simulated arc sounds based on the selected welding operation. The control circuitry 202 also commands the laser 128 to provide the simulated weld pool 138.

At block 418, the control circuitry monitors the welding parameters of the weld training torch 100. For example, the control circuitry 202 monitors the travel speed or torch orientation of the weld training torch 100 via camera(s) 122, and/or accelerometer 212 as described above. The control circuitry 202 also monitors the tip 110 to workpiece 114 proximity as described in relation to block 408. The control circuitry 202 also monitors torch angle via the accelerometer 212 and/or camera(s) 122. The control circuitry 202 stores the monitored parameters in memory 206 for later analysis.

At block 420, the control circuitry 202 compares the monitored parameters to reference parameters determined in block 404. The control circuitry 202 determines if the monitored parameters are within a threshold range of the reference parameters determined at block 404. If the monitored parameters are within a threshold range, then the control circuitry 202 proceeds back to block 408 to continue the simulated welding operation. If one or more of the parameters are not within the threshold range, the control circuitry 202 proceeds to block 422.

At block 422, the control circuitry 202 adjusts the welding simulation. For example, the control circuitry 202 may increase or decrease the vibration frequency provided by the vibration device 116 to adapt to the monitored weld parameters. The control circuitry 202 may also adjust the simulated weld pool 138 and the simulated arc sounds provided by the speaker 120.

At block 424, the control circuitry 202 provides real-time feedback to the trainee. For example, the speaker 120 may provide audio instructions to the trainee telling the trainee to adjust travel speed; tip 110 to workpiece 114 distance; or torch orientation, or torch angle in order to bring the monitored parameters closer to the reference parameters.

At block 426, the control circuitry 202 determines if an end simulation condition exists. For example, the simulation may run for a certain amount of time, and if the time has run out, the end simulation condition exists. In some examples, the trainee may toggle a control on the weld training torch 100 to end the simulation. In some examples, when the trainee releases the trigger 108, an end simulation condition exists. If an end simulation condition exists, the control circuitry 202 proceeds to block 428. If an end simulation condition does not exists, the control circuitry 202 proceeds to block 408 to continue the simulated welding operation.

At block 428, the control circuitry 202 compares the monitored parameters stored in memory 206 during the simulated welding operation to reference parameters 404. At block 430, the control circuitry 202 provides feedback based on the compared parameters to the trainee to improve the trainee's welding ability. Such feedback may include text, simulated graphics, or a video displayed on the user interface 118 or a smartphone 124. Feedback may also include audio instructions which may be provided via the speaker 120 or a smartphone 124.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Control circuitry, as used herein, includes digital and analog circuitry, discrete or integrated circuitry, microprocessors, DSPs, etc., software, hardware and firmware, located on one or more boards, that form part or all of a controller, and are used to control a welding process, or a device such as a power source or wire feeder.

Feedback, as used herein, includes a signal indicative of or responsive to an output or intermediate signal, which is provided to the controller and control decisions are made in response thereto. Feedback circuit, as used herein, includes a circuit that provides a signal indicative of or responsive to an output or intermediate signal. Feedback signal, as used herein, includes one or more signals that provide information about one or more parameters being monitored, such as output current and output voltage.

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A weld training torch for performing a simulated welding operation, the weld training torch comprising:
   a torch body comprising a handle and a neck;
   a tip extending from a distal end of the neck of the torch body, the tip coupled to the torch body;
   a trigger, or a proximity sensor, coupled to the handle;
   a vibration module within the torch body and mechanically coupled to the tip, the vibration module configured to vibrate in response to an actuation of the trigger or a detection, by the proximity sensor, of a proximity between the tip and a workpiece that is less than a threshold proximity;
   a communications device to communicate with an external computing device; and
   control circuitry configured to:
      receive a command via the communications device indicating a welding operation to be simulated with the weld training torch,
      select a vibration pattern based on the indicated welding operation, and
      control the vibration module to output the vibration pattern.

2. The weld training torch of claim 1, wherein the control circuitry is configured to:
   monitor at least one of a pressure applied to the tip via a pressure sensor, a travel speed of the tip via a travel speed sensor, or an orientation of the torch body via an accelerometer, during the simulated welding operation; and
   adjust the vibration pattern in response to at least one of the monitored pressure applied to the tip, the travel speed of the tip, or the orientation of the torch body.

3. The weld training torch of claim 1 further comprising:
   a camera configured to record the simulated welding operation, wherein the communications device is configured to transmit the recorded simulated welding operation to the external computing device.

4. The weld training torch of claim 1, further comprising a speaker configured to provide simulated arc sounds during the simulated welding operation.

5. The weld training torch of claim 4, wherein the control circuitry is configured to select the simulated arc sounds based on the indicated welding operation.

6. The weld training torch of claim 4, wherein the control circuitry is configured to: provide, via the speaker, audio instructions to complete the indicated welding operation.

7. The weld training torch of claim 6, wherein the control circuitry is configured to provide the audio instructions in real-time during the simulated welding operation.

8. The weld training torch of claim 1, further comprising: a display, the control circuitry being configured to: provide instructions to complete the indicated welding operation, via the display.

9. The weld training torch of claim 1, further comprising: a pressure sensor configured to measure a pressure applied to the tip, the control circuitry being coupled to the pressure sensor and configured to adjust an output of the vibration module based on the pressure measured by the pressure sensor.

10. The weld training torch of claim 1, further comprising: a travel speed sensor to monitor the travel speed of the tip, the control circuitry being coupled to the travel speed sensor and configured to adjust an output of the vibration module based on the travel speed of the tip determined by the travel speed sensor.

11. The weld training torch of claim 1, further comprising: a position sensor to track the orientation of the torch body, the control circuitry being coupled to the position sensor and configured to adjust an output of the vibration module based on the orientation of the torch body determined by the position sensor.

12. The weld training torch of claim 1, wherein the length of the tip is adjustable.

13. A weld training torch for performing a simulated welding operation, the weld training torch comprising:
a torch body comprising a handle and a neck;
a tip coupled to, and extending from, a distal end of the neck of the torch body;
a pressure sensor configured to measure a pressure applied to the tip;
a vibration module within the torch body, the vibration module configured to produce a vibration output in response to an actuation of a trigger of the weld training torch, or a detection of a proximity between the tip and a workpiece that is less than a threshold; and
control circuitry coupled to the pressure sensor, the control circuitry configured to adjust the vibration output of the vibration module based on the pressure measured by the pressure sensor.

14. The weld training torch of claim 13, further comprising a speaker configured to provide simulated arc sounds during the simulated welding operation, the control circuitry configured to select the simulated arc sounds based on a selected welding operation.

15. The weld training torch of claim 13, wherein the pressure sensor is in communication with the tip and the vibration module.

16. The weld training torch of claim 13, wherein the pressure sensor is a pressure transducer.

17. A weld training torch for performing a simulated welding operation, the weld training torch comprising:
a torch body comprising a handle and a neck;
a tip coupled to, and extending from, a distal end of the neck of the torch body;
a trigger, or a proximity sensor, coupled to the handle;
a vibration module within the torch body, the vibration module configured to vibrate in response to an actuation of the trigger of the weld training torch, or a detection, by the proximity sensor, of a proximity between the tip and a workpiece that is less than a threshold;
a user interface; and
control circuitry configured to:
receive a command via the user interface indicating a welding operation to be simulated with the weld training torch,
select a vibration pattern based on the indicated welding operation, and
control the vibration module to vibrate according to the vibration pattern.

18. The weld training torch of claim 17, further comprising a speaker configured to provide simulated arc sounds during the simulated welding operation, the control circuitry configured to select the simulated arc sounds based on a selected welding operation.

19. The weld training torch of claim 17, further comprising a pressure sensor configured to measure a pressure applied to the tip, the control circuitry configured to control the vibration module based on the pressure measured by the pressure sensor.

20. The weld training torch of claim 17, wherein the vibration module is coupled to the tip via an interface.

* * * * *